Sept. 27, 1932.　　　　C. C. ALLES　　　　1,879,002

MOVABLE MAGNETIC MARKER

Filed Nov. 11, 1930

CLIFTON C. ALLES
INVENTOR

PER Minier and Fike
ATTORNEYS

Patented Sept. 27, 1932

1,879,002

UNITED STATES PATENT OFFICE

CLIFTON C. ALLES, OF LOS ANGELES, CALIFORNIA

MOVABLE MAGNETIC MARKER

Application filed November 11, 1930. Serial No. 494,860.

This invention relates to improved movable magnetic markers, and has for one of its principal objects the provision of a series of markers which can be moved and placed at will upon a designated surface, the surface itself having inscriptions or insignia thereon which in conjunction with the markers form an intelligible visually presented device.

Another important object of the invention is to provide a series of movable or shiftable magnetic markers which when applied to a surface provided therefor and arranged in a desired or necessary sequence will produce a sign, picture or the like.

Still another and further important object of the invention is to provide in a means for musical instruction, a chart composed of a sheet of soft iron or the like, and having the necessary markings thereon to represent a musical staff, and markers composed of magnets with other markings or insignia thereon or adapted to be attached thereto, whereby these markings can be arranged and moved at will over the surface of the chart so as to visually display various notes and other portions of a musical scale.

Other and still further important objects of the invention will be apparent from the disclosures in the accompanying drawings and the following specification.

The invention, in a preferred form, is shown in the drawing and is hereinafter more fully described.

Figure 1:
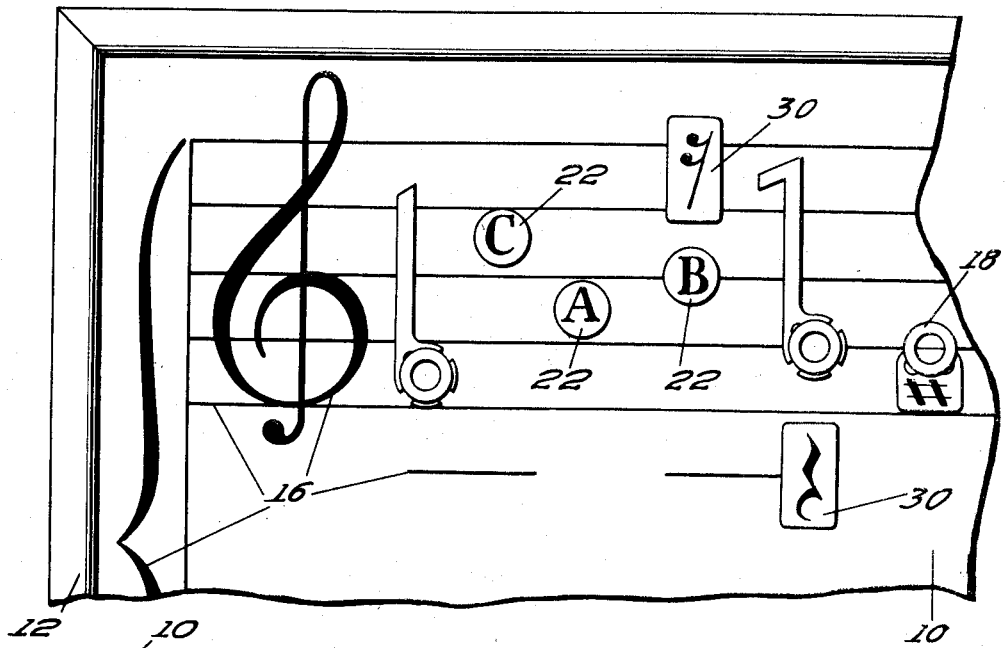
Figure 1 is a plan view of a portion of the soft iron musical scale of this invention, showing permanent insignia inscribed thereon and various movable markers applied thereto.

The reference numeral 10 indicates generally a sheet of soft iron or similar metal capable of magnetic action. This is preferably fitted in a surrounding frame or the like 12, and as shown in Figure 2, is provided on each side with a coating of paint or the like 14, this coating including or being adapted to have inscribed thereon a suitable series of notations or markings which in this particular case comprises the staff of a scale as illustrated at 16.

Figures 6, 7, 8:
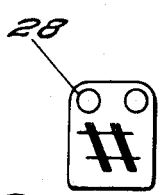
Figure 6 illustrates another form of marking device and fittings therein for mounting on a magnet.
Figure 7 is a perspective view of one of the preferred forms of magnets.
Figure 8 is a side elevation of a larger marker as adapted to be mounted in a magnet.

Various markings, comprising essentially permanent magnets which may be either of the open ring, closed ring, horseshoe, or other desired shape, and the closed ring type of which is as shown at 18 in Figure 7, are adapted to be used with the sheet 10. The preferred form of magnet includes integral lugs or supports 20, and a cap 22 is adapted to be mounted in or on the magnet, this mounting being preferably by means of a plug 24 adapted to be fitted or mounted inside the ring 18 which comprises the permanent artificial magnet.

The outer face of the cap 22 may have any sort of a marking thereon, such as a letter or the like which may be used to designate various notes as best shown in Figure 1.

Figures 2, 3, 4, 5:
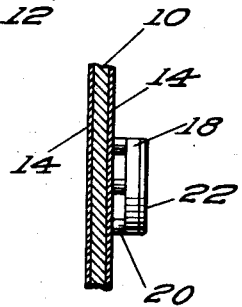
Figure 2 is a sectional view of a part of the scale, showing a marker mounted thereon.
Figure 3 is a bottom plan view of a marker.
Figure 4 is a side elevation of the display attachment, which is attached to the magnet to form a marker.
Figure 5 is a detail view of a portion of one of the movable musical note insignia, showing means for mounting the same on the board by a magnet.

Other devices, such as those which ordinarily form part of the musical scale can be applied to the chart by means of these magnets, and these devices may be of any suitable material, and made of any necessary or desired shape, as illustrated in Figures 1, 5, and 6, that in Figure 5 being shown with a plurality of openings or slots therein 26 into which the legs 20 of the magnet can be fitted for mounting on the board. Another modification is shown in Figure 6 whereby only two holes 28 are provided through which two of the legs of the magnet are passed for a suitable mounting on the chart.

When the notes are large, a device such as that illustrated in Figure 8 is provided, this including a plug 24 adapted to be fitted inside the ring 18 and the attached cap 30 which is larger than the cap 22 shown in Figure 4, thereby accommodating insignia such as that illustrated at 30 in Figure 1.

Figure 9:
Figure 9 illustrates a slight modification of one of the magnets.

Another modification of the magnet is shown in Figure 9 wherein a flat plate 32 is provided which has a hook 34 thereon, and into this hook may be removably supported any desired insignia in the form of a ticket or the like.

It will be evident that herein is provided a chart, having in combination therewith and adapted to be used thereon, a number of movable markers which when placed in any desired position on the chart will remain so supported and which further may be shifted around to illustrate various combinations both so far as indicia on the chart is concerned, and also with respect to various combinations of the markers themselves. The apparatus is applicable for a great number of uses, and it may be used widely in fields other than that of forming musical notations. For instance, it may be used in forming signs, the inserts carrying entire words or letters to be associated with each other and with portions of the background as desired. Again, the inserts themselves may be used to form pictures after the fashion of a cut-up puzzle. Other uses will be apparent.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A means for assembling visual indicia, comprising a background of magnetic material, and magnetic markers adapted to be applied to the background, together with means on the markers for applying various indicia thereto, said means comprising removable caps, and plugs on the caps adapted to be fitted into openings in the magnetic markers.

2. A means for assembling visual indicia, comprising a background of magnetic material, and magnetic markers adapted to be applied to the background, together with means on the markers for applying various indicia thereto, said means comprising removable caps, and plugs on the caps adapted to be fitted into openings in the magnetic markers, together with cover members on the caps, said cover members adapted for imprinting thereon.

3. A means for shiftably assembling visual indicia, comprising a solid unitary background of soft sheet iron, a plurality of permanently magnetized markers adapted to be applied to the background, and a number of suitably inscribed interchangeable caps, any one of which may be releasably supported on a marker.

4. A means for shiftably assembling visual indicia, comprising a solid unitary background of soft sheet iron, a plurality of permanently magnetized markers adapted to be applied to the background, and a number of suitably inscribed interchangeable caps, any one of which may be releasably supported on a marker, extending lugs integral with each marker and adapted to contact the background, and an additional plurality of variously shaped flat perforated indicia adapted to be mounted on the lugs and supported on the background by the markers.

In testimony whereof I affix my signature.

CLIFTON C. ALLES.